A. C. GOODELL.
MACHINE FOR FORMING SHEET-METAL TUBES.

No. 186,124.  Patented Jan. 9, 1877.

UNITED STATES PATENT OFFICE.

ABNER C. GOODELL, OF SALEM, MASSACHUSETTS, ASSIGNOR TO MORTIMER M. CAMP AND JOHN E. SEARLES, JR., OF NEW HAVEN, CONNECTICUT.

IMPROVEMENT IN MACHINES FOR FORMING SHEET-METAL TUBES.

Specification forming part of Letters Patent No. 186,124, dated January 9, 1877; application filed August 28, 1876.

*To all whom it may concern:*

Figure 1:
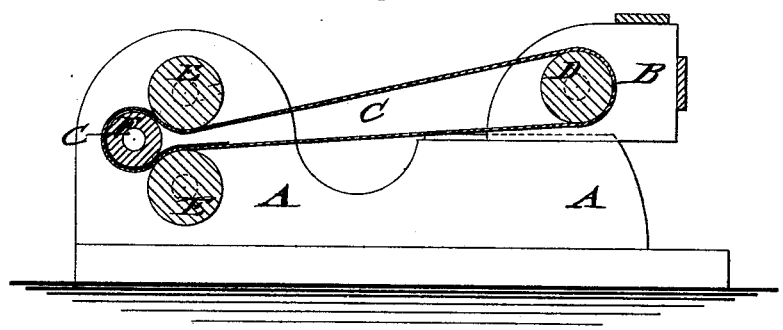
Figure 2:
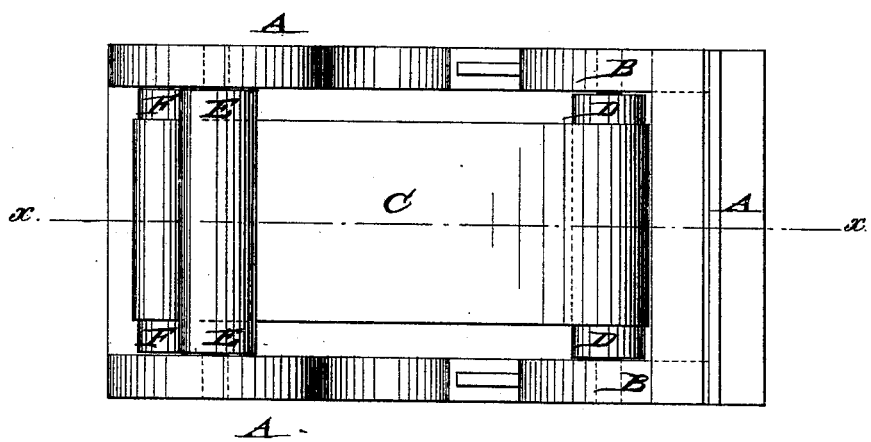

Be it known that I, ABNER C. GOODELL, of Salem, in the county of Essex and State of Massachusetts, have invented a new and Improved Machine for Forming Sheet-Metal Tubes, of which the following is a specification:

In the accompanying drawing, Figure 1 represents a vertical longitudinal section of my improved machine for forming sheet-metal tubes on line $x\ x$, Fig. 2; and Fig. 2 is a top view of the same.

Similar letters of reference indicate corresponding parts.

The invention has reference to an improved machine or apparatus for forming sheet-metal tubes in rapid and perfect manner; and it consists of an endless belt of suitable strength, that is revolved by a driving-roller mounted in a sliding carriage, and applied to a detachable tube-forming mandrel by top and bottom stretching-rolls. The sheet-metal blank is fed to the mandrel by being introduced between it and the belt, and formed by lapping around the same.

In the drawing, A represents the supporting-frame of my improved machine for forming sheet-metal tubes, and B a sliding carriage, guided on suitable ways of frame A, and moved forward and back to loosen or tighten the revolving endless or other belt C, by which the forming of the tubes is accomplished. The endless belt C is made of leather, or other suitable material of the required strength. It is revolved by a driving-roller, D, that is mounted upon sliding carriage B, and revolved by belt or pulley or other power-transmitting mechanism. The sliding carriage may be clamped by suitable mechanism to the supporting-frame, to retain the endless belt in tight condition for forming the blank. The belt is passed between a pair of fixed guide and stretching rolls, E, of which one bears on the upper, the other on the lower, part of the belt, to a mandrel, F, which is pressed by the stretched belt against the guide-rolls E. The guide-rolls E are mounted, either in stationary or adjustable manner, to frame A, while the mandrel F is loose in the belt, to be detached whenever a tube has been formed. The mandrel F varies in size according to the thickness of tubes to be formed, the machine being capable of producing any size of tube, from the largest to the smallest. The sheet-metal blank is fed in from the side of the revolving belt, and carried by the same over the mandrel, so as to lap around the same and form the tube. The sliding carriage is then moved forward and the tube taken from the mandrel, and the belt is then stretched again and another blank introduced. The tubes are thus formed in perfect and quick manner, and of any required length and thickness, as rapidly as the blanks may be fed and the tubes removed.

Having thus described my invention, what I claim as new, and desire to secure by Letters Patent, is—

A machine for forming sheet-metal tubes, consisting of an endless belt stretched on a movable driving-roller at one end, and on a pair of guide-rollers at the other end, in connection with a loose interchangeable mandrel, on which the tube is formed by the belt, substantially in the manner and for the purpose specified.

ABNER C. GOODELL.

Witnesses:
CHAS. M. PUTNAM,
CHARLES SEWALL.